Dec. 26, 1950     C. K. YEAMANS     2,535,980

HARD BOILED EGG SHELL REMOVER

Filed June 16, 1947

INVENTOR
CHARLES K. YEAMANS

BY Wilfred E. Lawson

ATTORNEY

Patented Dec. 26, 1950

2,535,980

UNITED STATES PATENT OFFICE 2,535,980

HARD-BOILED EGGSHELL REMOVER

Charles K. Yeamans, Houston, Tex.

Application June 16, 1947, Serial No. 754,966

2 Claims. (Cl. 146—2)

My invention relates to a simple implement for easily and completely removing the shell from a hardboiled egg by simply depositing the egg therein and turning a crank, when the egg, cleaned, will subsequently come out whole and intact without having been touch by human hands; the entire operation taking only a few minutes of time.

My implement is of very simple construction, made of easily obtainable material without machining and is consequently of low cost.

These and other objects, functions and advantages will be readily understood from the subjoined description with the aid of the accompanying drawing.

Figure 1 is an end view of Figure 1 seen from the left end thereof;

In the drawing like numerals denote the same details in the different views.

Figure 1:
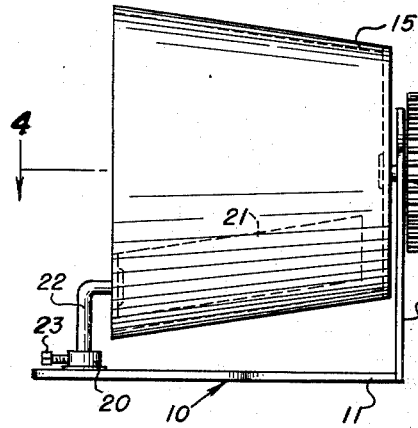
Figure 1 is a side elevation of the implement.
Figure 2:
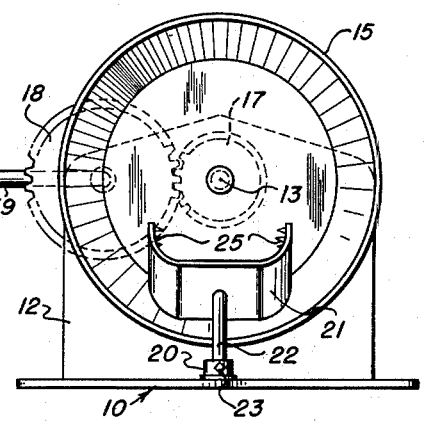
Figure 4:
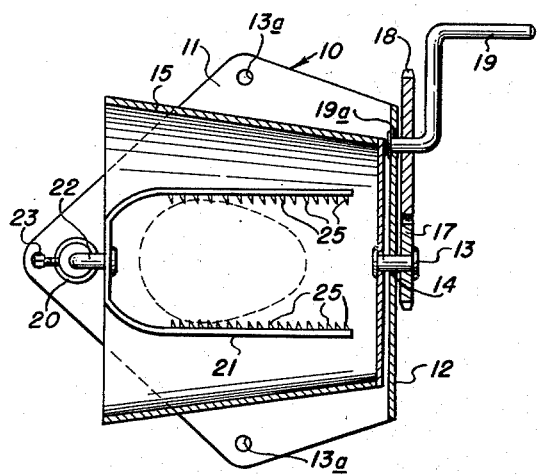
Figure 4 is a horizontal section taken substantially on line 4—4 of Figure 1.
Figure 3:
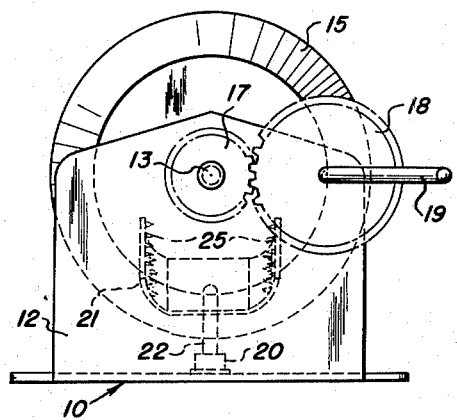
Figure 3 is an end view as seen from the right of Figure 1.

Numeral 10 generally designates a support on which the other ports of the implement are mounted the same comprising a base 11 and a vertical side 12. The egg sheller is rigidly secured to a suitable support, such as a table, by screws, not shown, or the like passing through holes 13a in the horizontal base 11. The side portion 12 is disposed at about right angles from the base portion 10. On this side portion 12 is mounted to rotate on a stud 13, in a bearing opening 14, a cup or drum 15 having the shape of a conic frustum, open at its large forward end and firmly secured at its bottom on said stud. The stud 13 also has a pinion 17 fastened thereon, so that the stud or shaft 13, drum 15 and pinion 17, constitute a unit to be revolved together by a gear wheel 18, by means of a crankhandle 19, which is pivoted for rotation in a bearing opening 19a in the upper end of the side wall portion 12.

At the side of the base 11 remote from the side 12 is a socket 20, which removably but firmly supports a shell-cracking member of substantially U-shape and comprising the spaced relatively wide blades 21 on an arm 22, which arm is secured in said socket by a set screw 23.

Along the inner surface of each of said blades 21, is a multiplicity of sharp teeth or egg shell piercers 25 are to be seen.

The operation of the shell cracker is the following: a hard boiled egg is deposited between the toothed blades 21 and the crank 19 turned at suitable speed.

The egg will be contacted on one side by the wall of the drum and will be rolled between and in contact with the stationary sharp teeth 25, which will penetrate the eggshell. After a few turns of the crank handle, the entire eggshell will be loosened and will fall off and the bare egg, with a clean, whole surface is then ready to be removed from between the blades and replaced by another egg in its shell.

It is to be understood that the invention as herein disclosed may be varied from the details described and shown without departure from the spirit of the subjoined claims.

I claim:

1. In a device of the class described, a bracket, a drum mounted for horizontal rotation on said bracket, said drum having one end open and its other end closed, means mounted on said bracket and operatively connected with the closed end of said drum for imparting rotary motion thereto, a substantially U-shaped member having spaced relatively broad side portions projecting inwardly at the open end of said drum adjacent to the lower part of the side wall thereof and adapted to receive between said portions an egg placed within the drum upon the said lower part of the drum side wall, teeth formed along the opposed surfaces of the side portions of said U-shaped member, said teeth engaging the egg when the egg is placed within the drum, and means on said bracket for supporting the outer end of said member.

2. In a device of the class described, a bracket, a drum mounted for horizontal rotation on said bracket, said drum having one end open and its other end closed, means mounted on said bracket and operatively connected with the closed end of said drum for imparting rotary motion thereto, a substantially U-shaped member having spaced relatively broad side portions projecting inwardly at the open end of said drum adjacent to the lower part of the side wall thereof and adapted to receive between said portions an egg placed within the drum upon the said lower part of the drum side wall, teeth formed along the opposed surfaces of the side portions of said U-shaped member, said teeth engaging the egg when the egg is placed within the drum, the said bracket comprising a body of sheet metal bent to an L shape to provide a base portion and a supporting portion for said drum and the operating means therefor, and said member supporting means comprising an arm projecting from said base portion centrally of and adjacent to the open end of said drum.

CHARLES K. YEAMANS.

REFERENCES CITED

The following references are of record in the file of this patent:

UNITED STATES PATENTS

| Number | Name | Date |
|---|---|---|
| 775,639 | Valk | Nov. 22, 1904 |
| 1,483,676 | Peterson | Feb. 12, 1924 |
| 1,648,979 | Bessette | Nov. 15, 1927 |

FOREIGN PATENTS

| Number | Country | Date |
|---|---|---|
| 10,011 | Great Britain | May 23, 1894 |
| 51,398 | Switzerland | Sept. 29, 1910 |